(12) United States Patent
Krampl et al.

(10) Patent No.: US 9,031,211 B2
(45) Date of Patent: May 12, 2015

(54) AUDIO PROCESSING APPARATUS

(75) Inventors: Gerfried Krampl, Villach (AT); Peter Linortner, Villach (AT); Christian Jenkner, Velden (AT); Thomas Ferianz, Bodensdorf (AT); Joachim Pichler, Landskron (AT); Thomas Linder, Spittal (AT); Gerhard Noessing, Villach (AT)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 2217 days.

(21) Appl. No.: 11/708,665

(22) Filed: Feb. 20, 2007

(65) Prior Publication Data

US 2008/0198985 A1 Aug. 21, 2008

(51) Int. Cl.
| | |
|---|---|
| *H04M 11/00* | (2006.01) |
| *H04M 1/738* | (2006.01) |
| *H04M 1/24* | (2006.01) |
| *H04M 1/253* | (2006.01) |
| *H04M 1/74* | (2006.01) |
| *H04M 19/00* | (2006.01) |

(52) U.S. Cl.
CPC ............. *H04M 1/7385* (2013.01); *H04M 1/24* (2013.01); *H04M 1/2535* (2013.01); *H04M 1/745* (2013.01); *H04M 19/005* (2013.01)

(58) Field of Classification Search
USPC ............. 379/93.05, 93.06, 93.09, 93.15, 353, 379/387.02, 93.07, 339, 324
See application file for complete search history.

(56) References Cited

U.S. PATENT DOCUMENTS

| | | | | |
|---|---|---|---|---|
| 6,023,724 | A * | 2/2000 | Bhatia et al. | 709/218 |
| 6,381,283 | B1 * | 4/2002 | Bhardwaj et al. | 375/257 |
| 6,470,046 | B1 * | 10/2002 | Scott | 375/222 |
| 6,937,616 | B1 | 8/2005 | Rezvani et al. | |
| 6,958,717 | B1 * | 10/2005 | Minogue | 341/102 |
| 7,031,454 | B1 | 4/2006 | Stelman | |
| 7,356,077 | B2 * | 4/2008 | Fala et al. | 375/224 |
| 2004/0047359 | A1 | 3/2004 | Jacobs et al. | |

FOREIGN PATENT DOCUMENTS

| | | |
|---|---|---|
| DE | 198 58 326 A1 | 6/2000 |
| DE | 100 59 174 A1 | 6/2002 |
| FR | 2 863 802 A1 | 6/2005 |

\* cited by examiner

*Primary Examiner* — Yosef K Laekemariam

(57) ABSTRACT

Audio processing systems and corresponding methods are disclosed, wherein the audio processing system comprises at least one of an analog portion and a digital portion.

15 Claims, 2 Drawing Sheets

AUDIO PROCESSING APPARATUS

BACKGROUND OF THE INVENTION

The present invention relates to an audio processing apparatus and a method for providing a corresponding audio processing apparatus.

BRIEF DESCRIPTION OF THE SEVERAL VIEWS OF THE DRAWINGS

In the following, embodiments of the invention will be discussed with reference to the attached drawings which are given as an example only and are not be construed as limiting the scope of the present invention, wherein.

DETAILED DESCRIPTION OF THE INVENTION

In the following, embodiments of systems for audio processing will be discussed with reference to the attached drawings. Audio processing, in this respect generally relates to the transmission and receiving of signals associated with audio and the processing of such a system. An example for audio processing employed in an embodiment is voice processing, i.e., the processing of voice-related signals, for example telephone signals. In an embodiment which will be discussed later in greater detail, on the one hand analog voice signals like telephone signals are received, converted into digital signals and transmitted over a network like the internet in the form of internet protocol packets and on the other hand, digital signals received over said network are converted to analog voice signals (so-called voice over IP).

Figure 1:
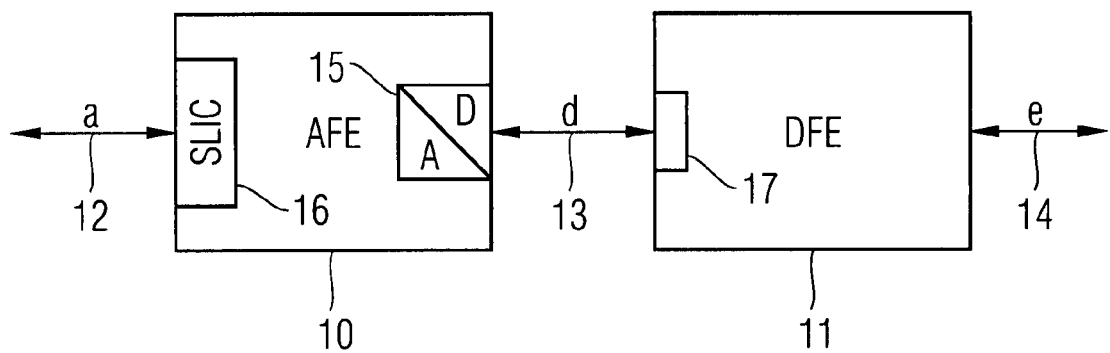
FIG. 1 shows a block diagram of an embodiment of the present invention.

In FIG. 1, a block diagram of an embodiment of an audio processing system according to the present invention is shown. The audio processing system shown in FIG. 1 comprises an analog frontend (AFE) 10, a digital frontend (DFE) 11 and a connection 13 connecting analog frontend 10 and digital frontend 11. In this respect, the term analog frontend refers to circuitry involving processing of analog signals, for example amplifying analog signals, analog filtering of signals, conversion of analog signals to digital signals and vice versa and the like. In contrast, the term digital frontend refers to digital signal processing, e.g., digital filtering, sample rate conversion (up- and downsampling) and the like.

In the embodiment shown, AFE 10 comprises a subscriber line interface (SLIC) 16. In an embodiment, AFE 10 is situated in a so-called central office, and line 12 is a connection to a subscriber, for example a user of a telephone or other audio services.

SLIC 16 serves for receiving analog signals via a line 12 and for sending analog signals via line 12. In AFE 10, the received analog signals or the analog signals to be sent are processed as mentioned above, for example by analog filtering. AFE 10 further comprises an analog/digital conversion unit 15 for converting received and processed analog signals to digital signals d and for converting digital signals d received from DFE 11 into analog signals.

Connection 13 in an embodiment is a point to point connection as shown in FIG. 1. As will be explained later, in other embodiments connection 13 may also be a bus system.

In an embodiment of the present invention, AFE 10 is a single integrated device.

DFE 11 comprises an interface 17 for receiving and transmitting data via connection 13. In an embodiment, DFE 11 comprises voice over IP processing capabilities for converting the received digital signal d into internet packets and sending these internet packets as signal e via a line 14. Line 14 in an embodiment is an Ethernet connection.

In another embodiment, AFE 10 and/or DFE 11 are provided as single integrated devices connected by connector 13. In such an embodiment, for manufacturing AFE 10 a manufacturing process suitable for analog circuitry may be used, whereas for manufacturing DFE 11 a process optimized for manufacturing digital circuits may be used. Therefore, both AFE 10 and DFE 11 may be manufactured using optimized processes.

Figure 2:
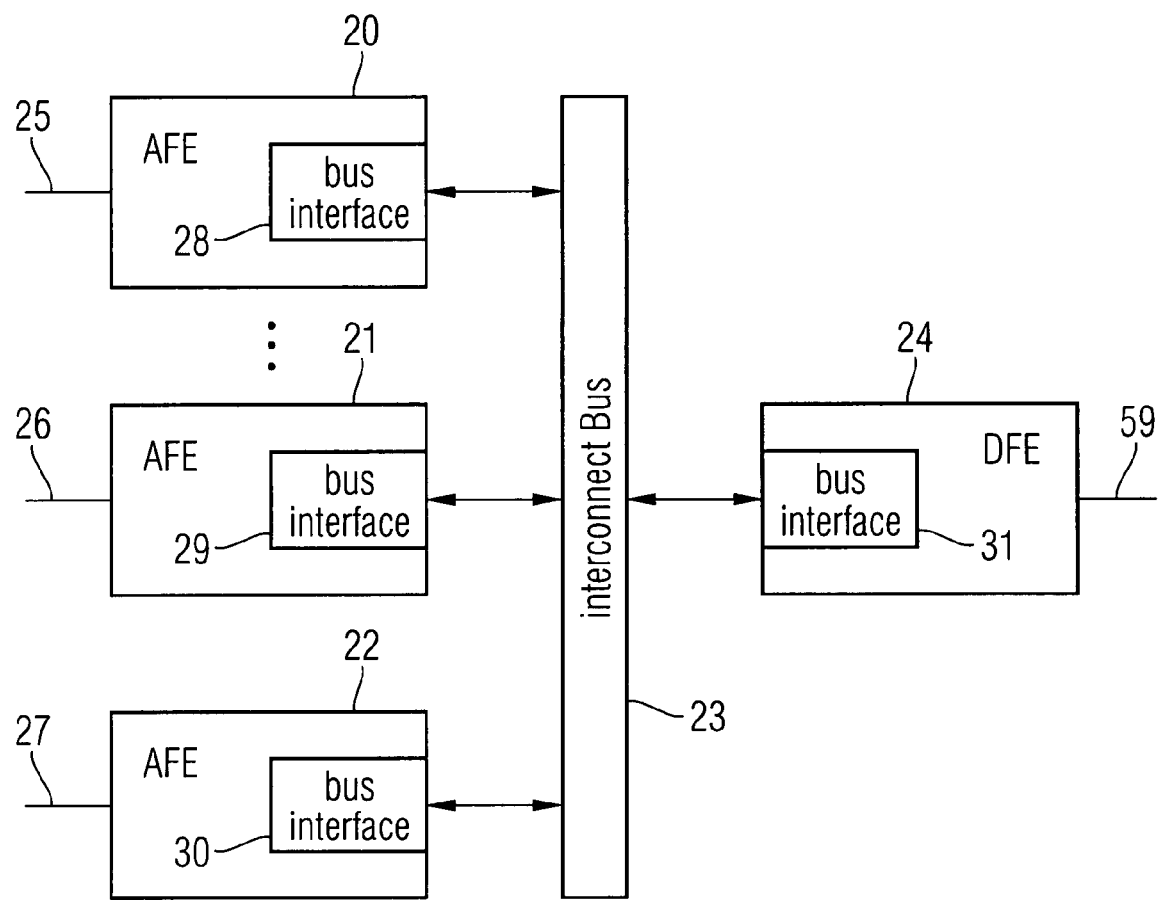
FIG. 2 shows a block diagram of an embodiment of the present invention.
Figure 3:
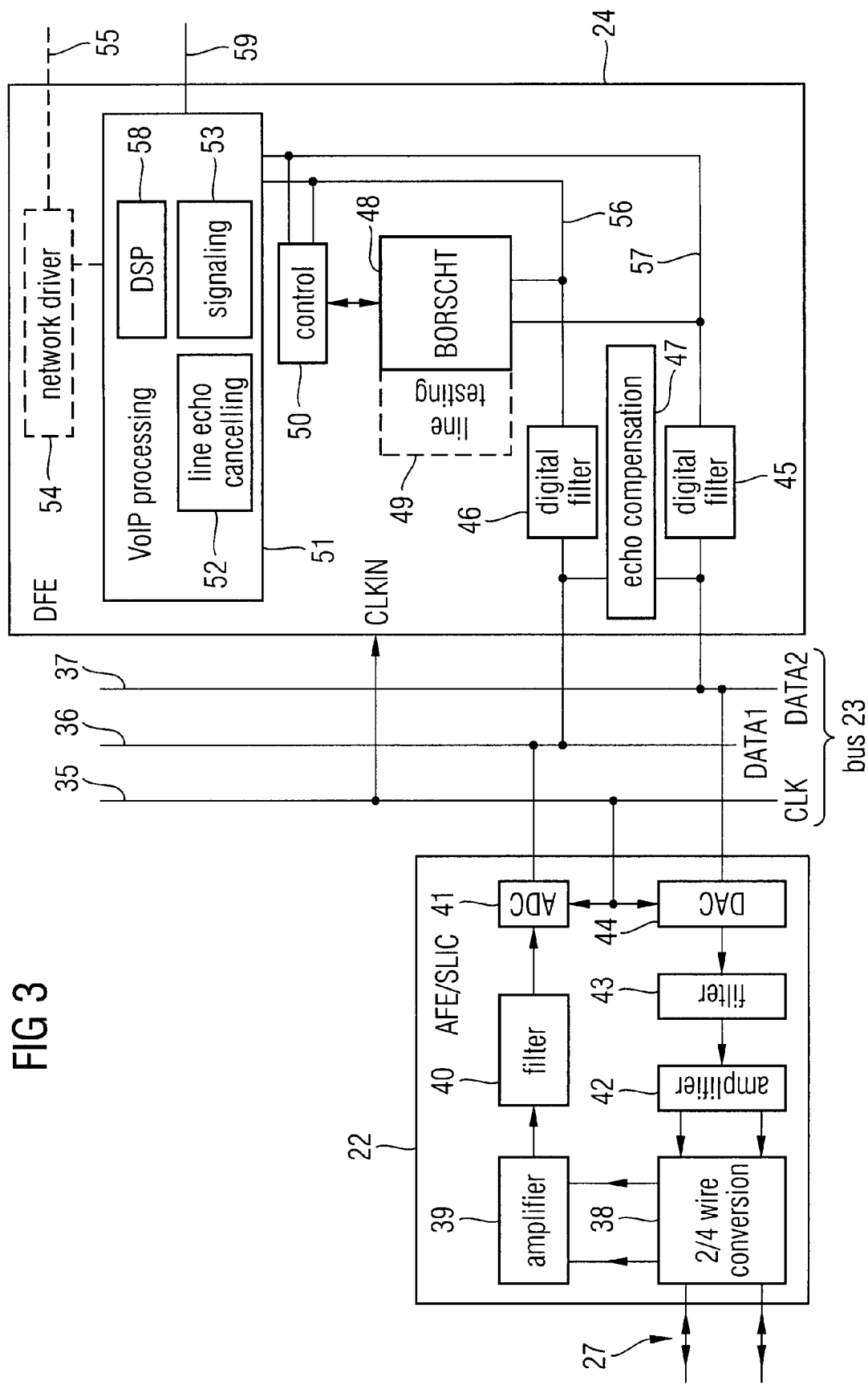
FIG. 3 shows a detailed diagram of some elements of the embodiment of FIG. 2.

A further embodiment will be described with reference to FIGS. 2 and 3, wherein FIG. 2 shows a block diagram providing a general overview over the embodiment and FIG. 3 shows elements of the embodiment of FIG. 2 in greater detail.

In FIG. 2 an audio system comprising AFEs 20, 21 and 22 connected via an interconnect bus 23 with a DFE 24 is shown. Like in the embodiment of FIG. 1, AFEs 20, 21 and 22 in an embodiment each comprise a subscriber line interface for connecting to a line 25, 26 and 27, respectively. As indicated by dots in FIG. 2, the number of AFEs in this embodiment is not limited to three, but any number of AFEs starting from one may be present. AFEs 20, 21 and 22 comprise bus interfaces 28, 29 and 30, respectively, which may comprise analog/digital conversion means like in the embodiment of FIG. 1 for converting analog processed signals into digital signals to be sent via interconnect bus 23 and for converting digital signals received from interconnect bus 23 into analog signals to be processed in AFEs 20, 21 and 22.

Accordingly, in the embodiment shown interconnect bus 23 is a digital bus.

DFE 24 comprises a bus interface 31 for connecting to interconnect bus 23, i.e., for sending digital signals via interconnect bus 23 to AFEs 20, 21 and 22 and for receiving digital signals from interconnect bus 23. DFE 24 is connected to a line 59 for outputting processed digital signals and for receiving signals therefrom.

In the embodiment of FIG. 2, AFEs 20, 21 and 22 and DFE 24 each are integrated chips integrating the analog or digital functions necessary for processing audio signals, for example voice signals. This will be explained in more detail in the following with reference to FIG. 3.

In FIG. 3, AFE 22 and DFE 24 as well as interconnect bus 23 are shown in more detail than in FIG. 2. While further AFEs are not shown in FIG. 3, it is to be understood that further AFEs may be provided in an embodiment having the same structure as AFE 22.

First, the structure of AFE 22 in the embodiment of FIG. 3 will be discussed.

In the embodiment of FIG. 3, line 27 is a double line, in particular a twisted copper line pair as for example used as tip line and ring line in POTS (Plain Old Telephone System) systems. However, in other embodiments other types of lines may be connected to AFE 22. Line 27 in the embodiment of FIG. 3 is used for bidirectional communication, i.e., both for transmitting and for receiving data.

In the embodiment of FIG. 3, line 27 is connected to a two/four wire conversion unit 38 which "splits" the bidirectional line 27 in two unidirectional double lines, one for receiving data and one for transmitting data. The double line for receiving data is coupled with an amplifier 39, whereas the double line for transmitting data is coupled with an amplifier 42.

Two/four wire conversion unit 38 may, in embodiments of the present invention, be realized in form of a bridge circuit, a hybrid circuit or may comprise resistors for measuring a current flowing in line 27, a voltage drop of said resistors being supplied to amplifier 39.

Amplifier 39 serves for amplifying the received signal and may, to this end, comprise one or more operational amplifiers. In the embodiment shown in FIG. 3, amplifier 39 feeds the amplified signal to a filter 40. In the embodiment of FIG. 3, the amplified signal is a single ended signal. However differential signals may also be used.

Filter 40 performs an analog pre-filtering before the filtered signal is converted into a digital signal in an analog-to-digital converter 41 and output to a first data line 36 of interconnect bus 23. In the embodiment shown, first data line 36 serves for transmitting data from AFE 22 and other AFEs which are not shown in FIG. 3 but shown for example in FIG. 2 to DFE 24. Analog-to-digital converter 41 is clocked by a clock signal via a clock line 35 of bus 23.

To transmit data, digital data received via a second line 37 of bus 23 from DFE 24 is converted to an analog signal in digital-to-analog converter 44. As analog-to-digital converter 41, digital-to-analog converter 44 is clocked by the already mentioned clock signal supplied by clock line 35.

The thus generated analog signal is filtered by a filter 43 and amplified by the already mentioned amplifier 42. Amplifier 42 again may comprise one or more operational amplifiers in an embodiment of the present invention and the embodiment shown converts a single ended signal received by filter 43 to a differential signal forwarded to two/four wire conversion unit 38.

In the embodiment of FIG. 3, the various components of AFE 22 are integrated in a single analog device. As shown in FIG. 3, embodiments provide for an integration of an analog front end with the SLIC, for example on a single chip. It should be noted that in other embodiments AFE 22 may comprise different and/or additional components. For example, in a system which is designed only for receiving audio data, the two/four wire conversion unit 38 may be omitted, and only the elements for receiving data, namely elements 39, 40 and 41, may be provided.

Next, the elements of DFE 24 of the embodiment of FIG. 3 will be described.

DFE 24 in the embodiment shown comprises only digital circuitry, i.e., only circuitry for processing and handling digital signals and, like AFE 21, in the embodiment shown is integrated in one chip. At least those elements interfacing bus 23, in the embodiment shown for example filters 45 and 46, are clocked by the clock signal supplied by clock line 35 to a clock input labeled CLKIN on DFE 24. Also other components may be clocked with this clock signal. However, in embodiments also different clock signals for different components are possible.

Signals received from AFE 22 or another AFE coupled to bus 23 via first data line 36 are filtered by a digital filter 46, whereas signal transmitted to AFE 22 or another AFE coupled to bus 23 via second data line 37 are filtered via a digital filter 45. Digital filters 45 and 46 in embodiments each may comprise one or more individual filters, for example band limiting filters, frequency response correction filters, interpolation and decimation filters for converting a sample rate of the data from a sample rate determined by the clock signal on clock line 35 to a different sample rate, which for example is required for outputting data via line 59, and other filters.

DFE 24 furthermore comprises an echo compensation filter 47 coupled between lines for sending and receiving data. Echo compensation filter 47 serves to at least partially reduce an echo, i.e. a part of the transmitted signal which enters the receive path of AFE 22 for example through reflection in the two/four wire conversion unit 38 or through reflection in line 27 or at an end of line 27. One possibility to achieve this is to subtract a correction signal based on the digital signal transmitted to second data line 37 from the digital signal received from first data line 36. It should be noted that other means for echo compensation may be alternatively or additionally employed in embodiments, for example an analog echo compensation may be provided by designing two/four wire conversion unit 38 in form of a balanced hybrid or bridge circuit.

The signal filtered by digital filter 46 is output to an internal receive line 56, whereas digital filter 45 receives a signal to be filtered and output to second data line 37 from an internal transmit line 57.

Internal receive line 56 and internal transmit line 57 are coupled with a voice over IP processing unit 51. Voice over IP processing unit 51 in the embodiment shown comprises a digital signal processor (DSP) 58 and generally serves for converting signals received via bus 23 into a format suitable for transmission over a network in the form of IP packets. In one embodiment, voice over IP processing unit 51 directly converts the digital signals received via internal receive line 56 into internet packets and converts received internet packets into digital signals output to internal transmit line 57. In an embodiment, voice over IP processing unit 51 may comprise a compression/decompression engine to compress and/or decompress voice data.

Voice over IP processing unit 51 in the embodiment shown in FIG. 3 further comprises a line echo canceling unit 52 and a signaling unit 53. Line echo canceling unit 52 serves for canceling echoes as explained above through filtering. It should be noted that in the embodiment shown line echo canceling unit 52 is provided in addition to echo compensation filter 47. In other embodiments, only one of these units may be provided.

Signaling unit 53 serves for integrating signals other than voice into the data, for example the IP packets, output by voice over IP processing unit 51, and for extracting such signals from data received via the above-mentioned network. One example for such signals are modem signals (modulator/demodulator) which are conventionally used for data transmission via POTS systems and use, in conventional systems, the same bandwidths as actual voice signals. Another type of such signals are dual-tone multiple frequency (DTMF) signals which in conventional telephones are used to control functions on a far end of the line, for example for querying an answering machine. In conventional POTS systems, also these signals use the same bandwidth as voice signals.

In the embodiment shown in FIG. 3, to prevent deterioration of such signals for example due to the above-mentioned compression of voice data, these signals are transferred into a frequency band not used for voice transmission and then, for example, are, unlike the voice data, not compressed to maintain signal integrity before converting such signals into output data, for example IP packets. On the receiving side, such signals are extracted from their frequency band and integrated into the frequency used for voice transmission.

In an embodiment, the data is output by voice over IP processing unit 51 to a line 59 and received via said line. Line 59 may, for example, be connected to a network driver which then transmits the data over a network like the internet, for example via Ethernet connections.

On the other hand, in other embodiments such a network driver is integrated as network driver 54 in DFE 24. In an embodiment, network driver 54 comprises an Ethernet driver for connection to an Ethernet cable 55.

In the embodiment shown, voice over IP processing unit 51 is provided for processing voice data. In another embodiment of the invention, an audio processing unit is provided for processing other types of audio data, for example music data received via a network or to be sent via a network, for example MP3 data.

In addition in FIG. 3 a BORSCHT unit 48 controlled by control unit 50 is shown, wherein both BORSCHT unit 48 and control unit 50 are coupled to internal receive line 56 and internal transmit line 57. In other embodiments, BORSCHT unit 48 and control unit 50 may form a single unit.

BORSCHT is an acronym standing for battery feed, overvoltage protection, ringing, signaling, coding, hybrid and testing. Of these functions, the hybrid function (two/four wire conversion) in the embodiment shown is not realized in DFE 24, but in AFE 22 and in particular in two/four wire conversion unit 38. The remaining functions will be briefly discussed in the following.

Battery feed relates to providing a DC current on line 27. The appropriate digital value corresponding to the analog DC value to be output may be provided by BORSCHT unit 48 via internal transmit line 57. In another embodiment, separate lines are provided between BORSCHT unit 48 and AFE 22 for generating the battery feed. In still another embodiment, the battery feed function may be completely realized in AFE 22 by providing a corresponding DC current source.

Overvoltage protection may be provided in form of fuses or in the form of current paths which shunt excess voltage to a supply voltage. Additional or alternative overvoltage protection elements may be employed in other embodiments in AFE 22.

Ringing generally relates to the process of providing a connection to the correct subscriber line and, in the case of a telephone call, sending a ringing signal to said line (like line 27) such that a telephone connected to said line rings or a modem or facsimile device connected to said line receives the call.

Signaling relates to supervising and controlling the connection via individual lines like line 27.

Coding relates to coding of the voice signals for transmission, for example, for internal processing in DFE 24 or for transmission via bus 23 to AFE 22.

Finally, testing relates to a testing mechanism for testing integrity of lines like line 27. In this respect, in one embodiment BORSCHT unit 48 provides an interface to connect to external testing equipment. In another embodiment, as indicated in dashed lines in FIG. 3 and labeled with reference numeral 49, BORSCHT unit 48 may integrate line testing functionality. To provide such functionality, BORSCHT unit 48 outputs, via bus 23 and AFE 22, testing sequences on line 27 and measures, again via AFE 22 and bus 23, voltages and/or currents on line 27. The same holds true for any other line connected to the system of the embodiment shown. With such line testing, open or closed loops or line resistances and capacitances may be detected.

As indicated, BORSCHT unit 48 may be controlled by a control unit 50 which generally controls and manages the functioning of DFE 24.

It should be noted that in other embodiments, BORSCHT 48 may be omitted or may realize only some of the functions discussed above.

It should be noted that the above-described embodiments serve only as examples and are not to be construed as limiting the scope of the present invention. Instead, besides the embodiments already discussed, further modifications and deviations from the described embodiments are possible. For example, while bus 23 is shown as comprising three lines in FIG. 3, other types of buses, for examples buses using additional lines for synchronization and control, may also be employed. Furthermore, it should be understood that while elements of AFE 22 and DFE 24 have been shown as various blocks, different partitioning of the different functions is also possible. Furthermore, as already mentioned, AFE 22 and DFE 24 in the embodiment of FIG. 3 are integrated devices. However, as already indicated, some of the functionalities like network driver 54 may be provided with a separate device.

What is claimed is:

1. A voice processing apparatus, comprising:
   an analog circuit portion integrated on a first single analog integrated circuit, said analog circuit portion comprising a first interface to connect to a subscriber line, and at least one of an analog filter and an amplifier operationally coupled to the first interface;
   a digital circuit portion separate from said analog circuit portion, said digital circuit portion comprising an interface to connect to an IP-based network; and
   a connection between said analog circuit portion and said digital circuit portion, wherein said connection is a digital connection and wherein said analog circuit portion comprises a first converter between analog signals and digital signals,
   wherein the digital circuit portion is integrated on a single digital integrated circuit, and
   wherein the digital circuit portion comprises a battery feed circuit, the battery feed circuit providing a digital value corresponding to an analog DC current value provided on the first interface to connect to the subscriber line.

2. The voice processing apparatus according to claim 1, wherein said connection comprises a bus system.

3. The voice processing apparatus according to claim 2, further comprising a further analog circuit portion integrated on a second single analog integrated circuit, the further analog circuit portion comprising a second interface to connect to a subscriber line, a second converter between analog signals and digital signals, wherein the further analog circuit portion is coupled with said digital circuit portion via said bus system.

4. The voice processing apparatus according to claim 1, wherein said digital circuit portion comprises a voice over IP processing unit to convert IP-formatted data to data to be transmitted via said connection to said analog circuit portion and to convert data received from said analog circuit portion to IP-formatted data.

5. An audio processing apparatus comprising:
   a plurality of integrated analog devices, each integrated analog device comprising:
   an analog front-end coupled to a respective analog audio line via a connector,
   at least one of an analog-to-digital converter to convert analog audio signals received via said respective analog audio lines into digital signals or a digital-to-analog converter to convert digital signals received by the integrated analog device to analog audio signals, and
   at least one of an analog filter and an amplifier operationally coupled to the connector,
   wherein each analog integrated device is disposed on a respective single analog integrated circuit;

a digital circuit portion separate from said plurality of integrated analog devices, wherein said digital circuit portion comprises an interface to connect to an IP-based network;

wherein the digital circuit portion is integrated on a single digital integrated circuit, and wherein the digital circuit portion comprises a battery feed circuit, the battery feed circuit providing a digital value corresponding to an analog DC current value provided on the connector to connect to the audio line; and a connection between said integrated analog devices and said digital circuit portion, said connection being a digital connection.

6. The audio processing apparatus according to claim 5, wherein, each of the plurality of integrated analog devices are coupled to the digital circuit portion via a bus system.

7. The audio processing apparatus according to claim 5, wherein said connector comprises a two/four wire conversion unit.

8. The audio processing apparatus according to claim 5, wherein said analog audio signals are telephone signals.

9. The audio processing apparatus of claim 5, wherein the audio processing apparatus includes both the analog-to-digital converter and the digital-to-analog converter.

10. An audio processing apparatus, comprising:

an analog circuit portion comprising an analog front-end and a converter to convert between digital and analog signals, the analog circuit portion disposed on a first single analog integrated circuit, the analog circuit portion further comprising at least one of an analog filter and an amplifier operationally coupled to a first connector to be coupled with a subscriber line;

an integrated digital device comprising an audio signal processing unit to convert audio signals between at least two formats, said at least two formats comprising an IP-based format, the integrated digital device being separate from the analog circuit portion, wherein the integrated digital device is integrated on a single digital integrated circuit, and wherein the integrated digital device comprises a battery feed circuit, the battery feed circuit providing a digital value corresponding to an analog DC current value provided on the first connector; and a second connector configured to couple said integrated digital device with the analog circuit portion, wherein said second connector comprises a digital connection, and wherein said converter is coupled with said second connector, a further analog circuit portion disposed on a second single analog integrated circuit, wherein the first analog integrated circuit and the second analog integrated circuit are coupled to said integrated digital device via a bus.

11. The audio processing apparatus according to claim 10, wherein said integrated digital device comprises at least one of a digital filter, an echo compensation filter, line testing equipment, signaling equipment, ringing equipment, battery feeding equipment and/or overvoltage protection equipment.

12. The audio processing apparatus according to claim 10, wherein said integrated digital device comprises a network driver.

13. A method for providing an audio processing apparatus, the method comprising:

providing an analog circuit portion disposed on a single analog integrated circuit, said analog circuit portion comprising an interface to connect to a subscriber line, a converter between analog signals and digital signals, and at least one of an analog filter and an amplifier operationally coupled to the interface;

providing a digital circuit portion disposed on a single digital integrated circuit separate from said analog circuit portion, said digital circuit portion comprising an interface to connect with an IP-based network, wherein the digital circuit portion comprises a battery feed circuit, the battery feed circuit providing a digital value corresponding to an analog DC current value provided on the interface to connect to the subscriber line; and connecting said analog circuit portion with said digital circuit portion with a digital interface, providing a further analog circuit portion disposed on a second analog integrated circuit, the further analog circuit portion comprising an interface to connect to a further subscriber line, and a further converter between analog and digital signals.

14. The method according to claim 13, wherein connecting comprises providing a bus system.

15. The voice processing apparatus of claim 13, wherein the digital circuit portion comprises an echo compensation filter that supports the first interface to connect to the subscriber line.

* * * * *